United States Patent [19]

Volz

[11] Patent Number: 4,649,755

[45] Date of Patent: Mar. 17, 1987

[54] SENSOR FOR MAGNETIZABLE MATERIALS

[75] Inventor: Hans Volz, Schwieberdingen, Fed. Rep. of Germany

[73] Assignee: International Standard Electric Corporation, New York, N.Y.

[21] Appl. No.: 685,869

[22] Filed: Dec. 24, 1984

[30] Foreign Application Priority Data

Dec. 23, 1983 [DE] Fed. Rep. of Germany ....... 3346643

[51] Int. Cl.$^4$ ...................... G01F 15/06; G01P 3/488; H01F 21/06
[52] U.S. Cl. ................................. 73/861.78; 324/173; 324/208; 336/135; 336/200
[58] Field of Search ................ 73/861.78, 861.77, 518; 324/173, 208; 336/134, 200, 135

[56] References Cited

U.S. PATENT DOCUMENTS

| | | |
|---|---|---|
| 3,053,087 | 9/1962 | Waugh ............................. 73/861.78 |
| 3,177,711 | 4/1965 | Ham et al. ........................ 73/861.78 |
| 3,636,470 | 1/1972 | Olivei et al. .................... 324/208 X |
| 3,858,138 | 12/1974 | Gittleman et al. ............. 336/200 X |
| 4,262,233 | 4/1981 | Becker et al. ................... 336/233 X |

FOREIGN PATENT DOCUMENTS 0110009 8/1980 Japan .................................. 336/200

OTHER PUBLICATIONS

W. W. Chow–IBM Technical Disclosure Bulletin, vol. 24, No. 9, Feb. 1982, pp. 4477–4479.

*Primary Examiner*—Charles A. Ruehl
*Attorney, Agent, or Firm*—T. L. Peterson

[57] ABSTRACT

A sensor for magnetizable materials is comprised of an inductive component and an evaluating circuit. The inductive component is constructed by thin-film techniques. The core is made of a ferromagnetic amorphous metal. Such a sensor can detect the presence of magnetizable materials with very high position accuracy. The sensor is employed in revolution counters and in angular-displacement transducers.

4 Claims, 5 Drawing Figures

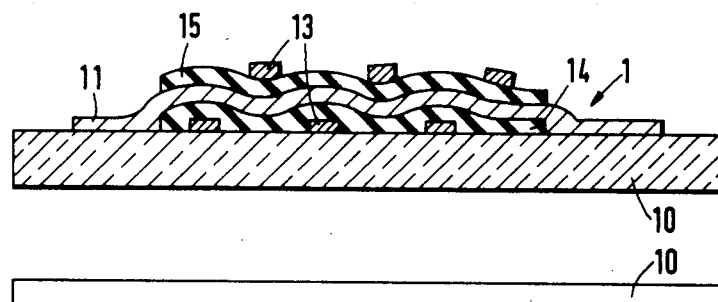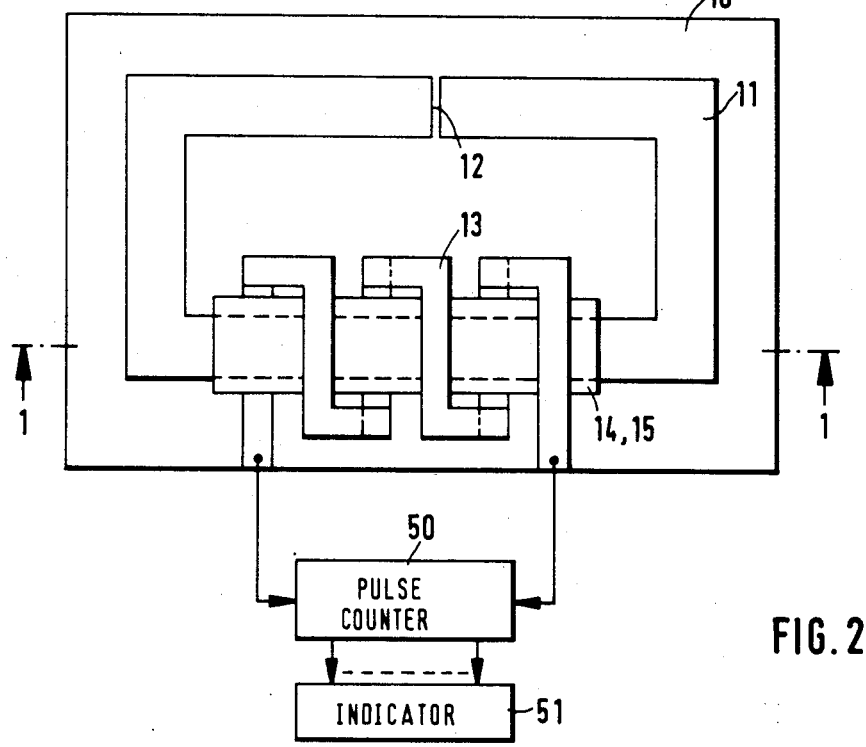

SENSOR FOR MAGNETIZABLE MATERIALS

BACKGROUND OF THE INVENTION

The present invention relates to a sensor for magnetizable materials, and more particularly to a sensor laminate.

PRIOR ART STATEMENT

Process control requires that essential operating parameters be determined. These include, inter alia, position, angular displacement, and speed of rotation. These parameters are frequently determined optically. However, optical techniques can be used only where any contamination is kept out. The parameters can also be determined by means of magnets whose positions are determined with magnetic field sensors. Very accurate position determination with such sensors is quite expensive, however. A particular disadvantage of these methods lies in the fact that the parts whose positions are to be sensed must be marked by permanent magnets. Such permanent magnets require separate operations during manufacture.

Prior art sensors are vulnerable to low accuracies.

SUMMARY OF THE INVENTION

In accordance with the sensor of the present invention, there is provided an inductive component and an evaluating circuit with which changes in the inductance of the inductive component can be sensed. The positions of magnetizable materials can thereby be determined with a high accuracy.

A magnetic circuit is provided which acts as a core. The magnetic circuit can also be surrounded by a second coil of the same kind. In this case changes in mutual inductance are sensed with the evaluating circuit. The evaluating circuit can be deposited, at least in part, on a common substrate with thin layers to form a coil (the inductive component). The magnetizable material of the magnetic circuit is preferably made of a ferromagnetic amorphous metal. The gap in the magnetic circuit must not be too narrow if magnetizable materials in its vicinity are to influence the behavior thereof. This is true in that the magnetic circuit, in accordance with the invention, is extremely thin. The sensor is highly sensitive even at gap widths equal to less than ten times the layer thickness of the magnetic circuit. Further, very high position resolution can be achieved. However, the gap width should not be smaller than the layer thickness.

BRIEF DESCRIPTION OF THE DRAWINGS

FIG. 1 is a longitudinal cross sectional view of the sensor of the present invention, taken on the line 1—1 shown in FIG. 2;

FIG. 2 is a top plan view of the sensor shown in FIG. 1;

DESCRIPTION OF THE PREFERRED EMBODIMENTS

Figure 3:
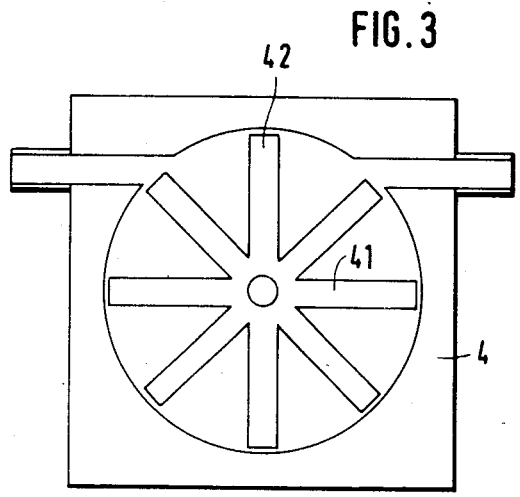
FIG. 3 is a diagrammatic transverse sectional view of a flowmeter which may be employed with a sensor of the present invention.

The sensor according to the invention includes an inductive component, as shown in FIG. 1. The drawing is not to scale. The base of the component 1 is a substrate 10 of glass. Other possible substrate materials are quartz, semiconductors or ceramics. On the substrate 10, a magnetic circuit 11 is deposited in the form of a rectangular ring. On one of the long sides of the rectangle, the magnetic circuit 11 has a gap 12 (FIG. 2). On the side opposite the gap 12, narrow strips of an electrically conductive material are so arranged above and below the magnetic circuit 11 as to form a coil 13 surrounding the magnetic circuit 11. In the area of the coil 13, the magnetic circuit 11 is isolated from the coil 13 by an overlying intermediate layer 15 and an underlying intermediate layer 14.

The section of FIG. 1 clearly shows the order in which the individual layers of the inductive component 1 are deposited. First, those portions of the coil 13 are deposited by sputtering through a mask which are to lie under the magnetic circuit 11. They are followed by the first insulating intermediate layer 14, the magnetic circuit 11, the second insulating intermediate layer 15, and the remaining portions of the coil 13. Instead of sputtering, the layers can be deposited by evaporation. The selective deposition of the individual layers can also be performed by using photolithographic techniques. In any case, the gap 12 must be formed by a method with which sharp edges and precisely reproducible dimensions are obtained, e.g., by photolithography. The width of the gap 12 is preferably about one to ten times the layer thickness of the magnetic circuit 11.

Materials especially suited for the magnetic circuit 11 are ferromagnetic amorphous metals. Such metals have excellent magnetic properties and are ideally suited for the fabrication of thin layers. Good ferromagnetic properties are exhibited by amorphous metals which are alloys based on transition elements of the iron group. The amorphous metal may contain metalloids (B, C, Si, Ge, P) and titanium, zirconium, hafnium, and/or niobium. Up to 5% (atom %) of the amorphous metal may consist of other elements. Especially suited are amorphous metals which are Co-Fe-base alloys, preferably $Co_xFe_yB_{100-x-y}$, where $70 \leq x \leq 80$ and $4 \leq y \leq 10$ (x, y in atom %). The insulating intermediate layers 14 and 15 are made of quartz, but other commonly used insulating materials, such as $AL_2O_3$, $Ta_2O_5$, and TiO, could be used as well. The coil 13 is made from gold but could also be made from any other conductive material commonly used in the fabrication of thin films. It could even be made from the same material as that of the magnetic circuit 11.

The evaluating circuit can be any circuit capable of sensing a change in inductance or determining the absolute value of the latter. The evaluating circuit or a portion thereof can be deposited on the substrate 10 of the inductive component 1.

In the same manner as the coil 13, a second coil may surround the magnetic circuit 11. In this case, the evaluating circuit must be designed to sense changes in mutual inductance.

The following describes some applications of sensors in accordance with the invention.

A sensor in accordance with the invention can be used to advantage for sensing rotary motions of an arrangement. In an automobile, for example, the rotary motion of a drive gear can be evaluated to determine the speed of travel and the number of kilometers covered. The engine speed can be determined in the same manner. To sense a rotary motion, the body whose rotary motion is to be sensed, or a part permanently connected therewith, is provided with a projection of magnetizable material. The inductive component 1 of the sensor is mounted so that the projection passes by the gap 12 in the immediate vicinity of the latter. In this manner, the reluctance in the area of the gap 12 and, thus, the inductance of the inductive component 1 are changed. In an automobile engine, for example, the starter ring gear is ideally suited for sensing the rotary motion of the engine. The gear rotates at the same speed as the engine, and its teeth can be used as the necessary projections of magnetizable material. Thus, not only the speed of rotation but also the respective angular displacement can be determined with very close accuracy. However, this necessitates determining the zero position by means of an additional projection from the gear and of an additional sensor.

The arrangement just mentioned or a corresponding arrangement makes it possible to electrically initiate rotation-angle-dependent processes in an internal-combustion engine. Such processes which can be electrically initiated are the ignition and the opening and closing of electrically operated valves.

If desired, a pulse counter 50 and an indicator 51 may be connected from the ends of coil 13 as is shown in FIG. 2.

Figure 4:
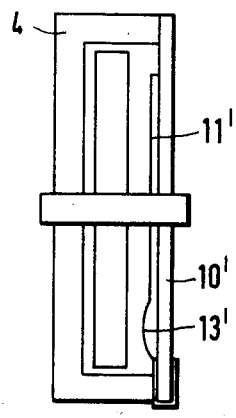
FIG. 4 is a diagrammatic vertical sectional view of the flowmeter of FIG. 3; and, FIG. 5 is a diagrammatic view of the sensor for the flowmeter of FIGS. 3 and 4.
Figure 5:
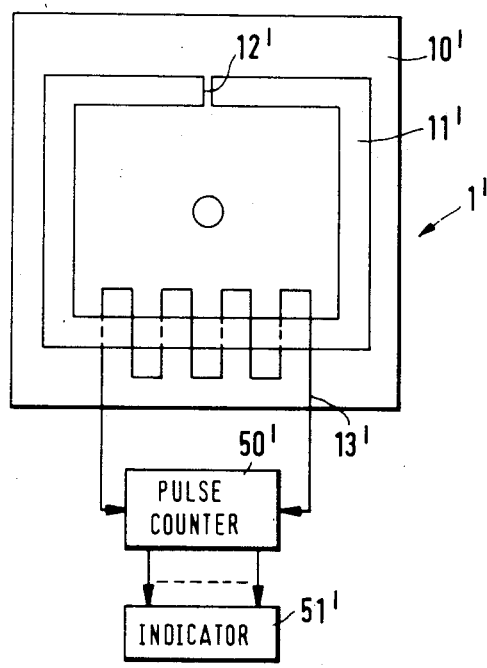

Another application of a sensor according to the invention will now be explained with the aid of FIGS. 3, 4 and 5. FIGS. 3 and 4 show two diagrammatic cross sections of a flowmeter. A vane wheel 41 is so mounted in a case 4 as to be rotated by a flow of fluid. One of the side-walls of the case 4 is also a substrate 10' of an inductive component 1', identical to inductive component 1. FIG. 5 is an inside elevational view of the sidewall forming a substrate 10'. It shows a magnetic circuit 11' with the gap 12'; a coil 13' is drawn in outline. FIG. 4 also shows in outline how the connections of the coil 13' are brought as thin layers to the outside. At least one of the vanes 42 of the vane wheel 41 contains magnetizable material. The passage of such a vane 42 by the gap 12' can thus be sensed. Such a flowmeter can be used to measure the fuel consumption of an automobile, for example.

As in the case of FIG. 2, FIG. 5 shows a pulse counter 50' and an indicator 51' connected from coil 13'. Indicator 51' indicates total flow through the flowmeter.

A sensor according to the invention can also be used as a position sensor for rectilinear motions, e.g., as a contact for an elevator control mechanism.

Some liquids, too, are more or less ferroelectric. Thus, a sensor according to the invention can also be used to determine the level of a liquid in a tank. By an absolute-value measurement, the level can be determined with a single sensor. By measuring changes in inductance, it is possible to sense when the level exceeds or falls below required limits.

What is claimed is:
1. A sensor for magnetizable materials comprising:
a substrate;
an inductive component including thin layers fixed on said substrate, one of said layers being made of magnetizable material, said one layer forming a magnetic circuit with a gap therein, other of said layers passing partly over and partly under said magnetic circuit at a point along said circuit remote from said gap, said other layers forming a coil surrounding said circuit; and
intermediate layers insulating said circuit from said coil,
wherein said magnetic circuit is made of at least one ferromagnetic amorphous metal alloy,
wherein said alloy includes transition elements of the iron group, and
wherein said alloy contains metalloids selected from the group consisting of (C, Si, Ge).
2. A sensor as claimed in claim 1, wherein:
said alloy contains elements selected from the group consisting of titanium, zirconium, hafnium, and niobium.
3. A sensor as claimed in claim 2, wherein:
at least 95% (atomic %) of said alloy is selected from the group consisting of titanium, zirconium, hafnium, and niobium.
4. A flowmeter comprising:
a housing having a fluid inlet and a fluid outlet;
a rotor rotatable in said housing, said rotor having vanes to be rotated with said rotor by fluid impinging upon said vanes, said vanes having ferromagnetic portions;
a substrate;
an inductive component including thin layers fixed on said substrate, one of said layers being made of magnetizable material, said one layer forming a magnetic circuit with a gap therein positioned proximate to the path of said ferromagnetic portions to have the reluctance of said magnetic circuit changed by passage of said ferromagnetic portions in proximity thereto, other of said layers passing partly over and partly under said magnetic circuit at a point along said circuit remote from said gap, said other layers forming a coil surrounding said circuit, and a plurality of intermediate layers insulating said curcuit from said coil, wherein said magnetic circuit is comprised of at least one ferromagnetic amorphous metal alloy;
a pulse counter having an input and an output;
an indicator responsive to said pulse counter output for producing an indication of the number of pulses produced at said pulse counter output; and
wherein said coil is connected to said pulse counter input to cause the same to produce an output pulse each time one of said ferromagnetic portions passes said gap.

* * * * *